United States Patent [19]

Nason

[11] 3,952,130

[45] Apr. 20, 1976

[54] MINERAL WOOL PAPER

[75] Inventor: Stephen G. Nason, Arlington Heights, Ill.

[73] Assignee: United States Gypsum Company, Chicago, Ill.

[22] Filed: July 17, 1974

[21] Appl. No.: 489,348

Related U.S. Application Data

[63] Continuation of Ser. No. 307,688, Nov. 17, 1972, abandoned.

[52] U.S. Cl. ................................ 428/332; 162/104; 162/145; 162/152; 428/538
[51] Int. Cl.² .......................................... E05D 15/26
[58] Field of Search ........... 162/152, 145, 124, 104; 156/39, 71; 428/224, 538, 539, 288, 289, 332

[56] References Cited
UNITED STATES PATENTS

| | | | |
|---|---|---|---|
| 1,790,839 | 2/1931 | Richter | 162/176 |
| 1,887,726 | 11/1932 | Weber | 162/145 |
| 2,901,390 | 8/1959 | Conklin et al. | 162/155 |
| 3,379,608 | 4/1968 | Roberts et al. | 162/145 |
| 3,494,824 | 2/1970 | Roberts | 162/152 |
| 3,562,097 | 2/1971 | Von Hazmburg | 162/145 |

FOREIGN PATENTS OR APPLICATIONS

| | | | |
|---|---|---|---|
| 531,357 | 10/1956 | Canada | 162/145 |

*Primary Examiner*—S. Leon Bashore
*Assistant Examiner*—Peter Chin
*Attorney, Agent, or Firm*—Samuel Kurlandsky; Stanton T. Hadley; Donnie Rudd

[57] ABSTRACT

A paper product comprising mineral fibers and a non-fibrous, highly refined gel binder, the product having a thickness no greater than about 0.080 inches and an apparent specific gravity of between about 0.25 and about 0.85. The product may be a sheet no thicker than about 0.012 inches, or a paperboard.

7 Claims, No Drawings

MINERAL WOOL PAPER

This a continuation of application Ser. No. 307,688, filed Nov. 17, 1972, now abandoned.

BACKGROUND OF THE INVENTION

In the paper-making industry, a variety of additives are incorporated to achieve one property or another. Generally, however, the paper products are all characterized by a common ingredient and property — cellulosic fibers which are held together by hydrogn bonding. Because of this, binders are not incorporated as such.

The main disadvantage of cellulosic fibers is their combustibility and specifically the smoke generated therefrom. Stringent fire codes prohibit in certain instances the use of such paper even as cover sheets for gypsum wallboard, which is otherwise noncombustible, because of the combustibility of the cellulosic fibers. Fireproofing agents are undesirable additives due to their expense and inability to eliminate the smoke hazard from wallboard.

A recent paper product disclosed in U.S. Pat. No. 3,562,097 incorporates mineral fibers in a paper designed especially for the paper cover sheets of gypsum wallboard. However, the usual cellulosic fibers are also included, although in lesser amounts, so that no binder is necessary or even disclosed. The resultant product, although superior in having increased porosity, still has cellulosic fibers that tend to render the product more combustible than would be the case without the cellulosic fibers. Yet, attempts to eliminate the cellulosic fibers from the paper disclosed in the aforesaid patent have resulted in a "sheet" which does not hold together. This is not surprising, as mineral or inorganic fibers lack the capability of being hydrated or bonded together by hydrogen bonding.

A highly refined gel has been used in board products in the past, some of which have incorporated mineral fibers, among other ingredients. Examples of these are disclosed in U.S. Pat. Nos. 2,773,763 and 3,494,824. However, in each case the product has been an insulation or acoustical board having thicknesses on the order of 5/8 of an inch. Obviously, such boards are not suitable as paper or paper sheets, and cannot be used as such.

SUMMARY OF THE INVENTION

It has been discovered that a paper product comprising mineral fibers can be constructed with sufficient strength, if a highly refined cellulosic gel is incorporated as a binder. Depending upon the other ingredients, such a paper product is even non-combustible, without the addition of conventional fireproofing agents. Thus, the invention relates to a paper product featuring mineral fibers and a highly refined gel binder. More specifically, the paper product may be a paper sheet or paperboard not exceeding about 0.080 inches in thickness, and having an apparent specific gravity of between about 0.25 and about 0.85, wherein the fibers are exclusively slag wool fibers to the exclusion of cellulosic fibers, or in some instances mixed with the latter, and the gel is preferably a nonfibrous cellulosic gel having a standard TAPPI drainage time of between about 300 to about 1200 seconds per 1.2 gram sheet weight, and a shrinkage value of at least 20% when rolled after draining into a cylinder and dried unrestrained at about 250°F. A gypsum board is also provided having such a paper product covering and bonded to at least a portion of the surface of the core of the board.

Accordingly, it is an object of the invention to provide a paper product wherein the chief, and in some cases the only, fiber constituent is a noncombustible mineral fiber.

Another object is to provide a gypsum board covered with such a paper product.

It is a related object of the invention to provide such a paper product wherein the mineral fibers are bound together with strength sufficient to make a durable paper.

Still another object of the invention is to provide such a product which has increased dimensional stability.

It is another object of the invention to provide a mineral fiber paper product having increased tensile strength through the use of a highly refined gel binder.

Yet another object of the invention is to provide a paper product as set forth in the previous objects which can be manufactured by conventional paper-making methods and apparatus.

Other objects and advantages will become apparent upon reference to the following discussion of the preferred embodiments.

DESCRIPTION OF THE PREFERRED EMBODIMENTS

This disclosure concerns a paper product capable of being made on conventional apparatus, which relies on mineral fibers for the properties characteristic thereof, and a highly refined or hydrated gel binder to hold those fibers together. The product can be a paper or paperboard, either single or multiple ply having a thickness no greater than about 0.080 inches, including paper sheets which are those having a thickness no greater than about 0.012 inches, as is well known in the art. The limit of 0.080 inches is determined by the fact that this is the largest thickness generally available on a single conventional paper-making machine, including both Fourdrinier and cylinder machines. The apparent specific gravity of the paper product may range from about 0.25 to about 0.85, depending on the strength desired and the type of fibers used, as is described below.

"Mineral fibers", as used in this application, means any inorganic fibers such as slag wool, glass fibers which are spun or drawn, asbestos, steel wool and rock wool. By "slag wool", it is meant any bunched amorphous elongated filaments having been made predominantly from iron, copper, or lead blast furnace slag, and having a composition comprising silicon dioxide and metallic oxides, the percentage by weight of the metallic oxides being greater in total than the percentage of silicon dioxide. For example, a representative sample of slag wool commercially available from the Birmingham, Alabama plant of the United States Gypsum Company has an analysis of 33–39% (by weight) of $SiO_2$, 10–12% of $Al_2O_3$, 34–38% of $CaO$, 8–10% of $MgO$, and 1–7% of $Fe_2O_3$. As will be discussed hereafter, in some cases cellulosic fibers may be added, and this includes any conventional wood fibers such as ligno-cellulosic fibers. In any case, the length of the fiber used is not critical, and can be altered where desired to make use of known properties.

In any case, the paper product features as a binder a highly refined gel of the type disclosed in U.S. Pat. Nos. 3,379,608 and 3,494,824, the details of which are hereby incorporated herein by reference. In brief, the gel is a mechanically induced water-activated hydrated cellulosic binder formed by subjecting a chemically cooked paper pulp, preferably prepared by the sulfate process, to an intense mechanical hydration to give an essentially nonfibrous mass having a very slow drainage and high amount of shrinkage. Specifically, using a Hydropulper, a deflaker, and a series of refiners equipped with a lava tackle as described in the aforesaid patents, a gel can be prepared which has a maximum detectable particle length of 0.06 millimeter, a standard TAPPI drainage time of 300 to 1200 seconds per 1.2 gram sheet weight, and a shrinkage of between about 20 to 40% when rolled into a cylinder and dried unrestrained in an oven at 250°F.

For maximum fire resistance, the fiber content of the paper is limited to the mineral fibers, and preferably to slag wool, the remainder consisting of the gel binder. In such a paper product, the mineral wool comprises between about 50% and about 90% of the weight of the total dry solids, leaving a minimum of about 10% gel. The resulting product can be used as the paper cover sheet for gypsum wallboard, and still meet the most stringent building code requirements concerning flame spread and combustion.

Still other uses are available, as will be seen below, some of which do not have to meet stringent fire tests. Thus, where noncombustibility is not a requirement, it has been found that cellulosic fibers can be incorporated also, preferably in any amount of between about 30% and about 85% of the weight of the total dry solids. Because of the bonding provided by such cellulosic fibers, the minimum amount of gel binder that is necessary can be reduced to about 5%.

The process of making the paper product from the above-noted materials is conventional, using conventional apparatus. Because such processes as used for example on a Fourdrinier machine are so well known, a detailed description is not necessary other than to indicate by way of example that the furnish applied to the head box may be between about ½% and 6% on a dry solids basis, depending on whether a sheet or a mat is being made, the gel being added to the furnish prior to the head box in the machine chest, or earlier. The gel as added may have a consistency of between about 3 to about 7% on a dry solids basis. The paper product so formed may or may not be sized, as dictated by the end use as is well known.

Where the mineral fibers used are slag wool, the shot which is a characteristic and often undesired component thereof may have to be removed before forming the paper. That is, slag wool with shot will form a sheet or mat which when calendared has pin holes in it due to the crushing of the shot. Pinholes are not acceptable in gypsum board paper cover sheets, as the gypsum slurry tends to ooze out through the holes. Thus, where pinholes are unacceptable, the shot must be removed. In addition to conventional methods available for doing this, a preferred method is that described and claimed in copending application Ser. No. 315,399 filed on Dec. 15, 1972, now issued on Feb. 11, 1975 as U.S. Pat. No. 3,865,315. The method of that application briefly comprises milling a slag wool slurry of about 3% to about 8% in an attrition mill, which may be either a disc or cone type, or in a Hydropulper. After that, the slurry is diluted to about ¼ to ½% dry solids basis, and slowly agitated at about 20 to 100 RPM, permitting the shot to settle while the wool is carried by the streaming liquid. The wool furnish is then decanted. This method is preferred over conventional methods because more shot is removed.

EXAMPLES

For purpose of illustration only, and not by way of limitation except where specifically noted, examples were prepared from materials set forth below, in accordance with TAPPI Standard T205-os-71 as supplemented by T-220-os-71. In all cases, the gel is that described above, preferably using as a starting material unbleached kraft. Except where noted, a 12-inch by 12-inch Noble and Wood sheet mold was used. The properties were measured as follows: tensile strength and breaking length, by TAPPI Standard T 404-ts-66 using a Thwing-Albert tester; air porosity by TAPPI Standard T-460-m-49, using a Gurley SPS Densometer; and apparent specific gravity by TAPPI Standard T-220-os-71. All reported data are averages of between 2 to 6 individual readings, except of course for breaking length and apparent specific gravity, which are calculated.

Slag Wool

Tests were made on paper products wherein the fiber content was exclusively mineral fibers, and in particular, slag wool fibers. A first series of tests was run wherein the amount of gel was increased from 0% to 50%. The slag wool was white wool from the Birmingham plant identified above, with all shot removed. Six-inch handsheets were prepared, rather than 12-inch mold sheets. The results are set forth in Table I. When the gel content was increased above 50% on a dry solids basis, it was found to have a drainage time which was impractical for use on conventional papermaking apparatus.

A second series of tests was run to determine what range of calipers could be used. Because of the apparent increase in strength achieved by the 50% slag wool - 50% gel combination as set forth in Table I (sample 7), this composition was chosen in the second series. Starting materials and procedures were as in the first series described above, except that 12 inches × 12 inches molds were used. The results are set forth in Table II.

TABLE I

| Sample No. | Composition | CHARACTERISTICS OF SLAG WOOL — GEL PAPER PRODUCTS | | | | | | |
|---|---|---|---|---|---|---|---|---|
| | | Drainage Time Seconds | Caliper 1/1000 Inch | Basis Wt. Lbs./MSF | Tensile Lbs./In. Width | Breaking Length Meters | Porosity Sec/100 cc Air | Apparent Specific Gravity |
| 1 | 100% Mineral Fiber | 4 | SHEET DOES NOT HOLD TOGETHER CAN NOT BE TESTED | | | | | |
| 2 | 90% Mineral Fiber 10% Gel | 7 | 10.5 | 33.0 | 3.7 | 410 | 1 | 0.605 |
| 3 | 80% Mineral Fiber 20% Gel | 28 | 11.5 | 39.0 | 8.6 | 805 | 4 | 0.656 |
| 4 | 75% Mineral Fiber | 11.5 | 23.5 | 38.5 | 14.4 | 1380 | 4 | 0.688 |

TABLE I-continued

CHARACTERISTICS OF SLAG WOOL — GEL PAPER PRODUCTS

| Sample No. | Composition | Drainage Time Seconds | Caliper 1/1000 Inch | Basis Wt. Lbs./MSF | Tensile Lbs./In. Width | Breaking Length Meters | Porosity Sec/100 cc Air | Apparent Specific Gravity |
|---|---|---|---|---|---|---|---|---|
| 5 | 25% Gel 70% Mineral Fiber | 87 | 12.0 | 40.8 | 14.1 | 1270 | 19 | 0.654 |
| 6 | 30% Gel 60% Mineral Fiber | 220 | 13.0 | 40.4 | 17.9 | 1630 | 72 | 0.596 |
| 7 | 40% Gel 50% Mineral Fiber | 460 | 14.0 | 40.0 | 24.6 | 2250 | 280 | 0.549 |
|   | 50% Gel |   |   |   |   |   |   |   |

TABLE II

Characteristics of 50% Slag Wool and 50% Kraft Gel Product Products

| Sample Number | Caliper 1/1000's inch | Basis weight lbs/MSF | Porosity Sec/100cc | Tensile lbs/in. width | Breaking Length meters | Tear Factor Grams | Ap.Sp |
|---|---|---|---|---|---|---|---|
| 8 | 11 | 23.2 | 21 | 8.1 | 1320 | 26.4 | 0.4 |
| 9 | 17 | 48.6 | 72 | 16.7 | 1280 | 27.0 | 0.5 |
| 10 | 36 | 130.0 | 134 | 44.0 | 1260 | 37.8 | 0.6 |
| 11 | 47 | 150.0 | 107 | 49.8 | 1240 | 35.1 | 0.6 |
| 12 | 70 | 224.0 | 90 | 70.0 | 1220 | 36.7 | 0.6 |

A third series of tests was run to determine what effect, if any, the addition of other inorganic additives would have. Specifically, "CTS-2" clay, a kaolin clay, was pre-mixed with the gel in a Lightning Mixer for three minutes, the relative amounts being set forth in Table III. The slag wool used in Sample No. 14 was from a different souce than that heretofore described, namely the Corsicana, Texas plant of the United States Gypsum Company. The composition of this wool falls in the following ranges: about 34–37% $SiO_2$, about 7–15% $Al_2O_3$, about 10–20% $Fe_2O_3$, and about 32–37% $CaO$.

TABLE III

Characteristics of Slag Wool-Gel-Clay Paper Products

|  | Sample No. 13 | Sample No. 14 |
|---|---|---|
| % slag wool | 78.4 | 78.4 |
| % clay | 8.1 | 8.1 |
| % gel | 13.5 | 13.5 |
| Caliper (1/1000 inch) | 17.5 | 19 |
| Basis Wt. (lbs/MSF) | 74.26 | 73.44 |
| Porosity (sec/100 cc) | 10 | 7 |
| Tensile (lbs/in. width) | 6.1 | 6.4 |
| Breaking Length (Meters) | 505 | 538 |
| Apparent Specific Gravity | 0.820 | 0.745 |

It will be appreciated that these results are generally comparable to those set forth for Sample 3 above, particularly considering the fact that less gel was used. As was expected, the substitution of clay for gel tended to decrease the porosity.

Glass Wool

A fourth series of tests was run to illustrate that glass wool may be substituted for slag wool. Owens Corning glass roving having an average diameter of 3.5 micron and an average length of 0.5 inch was used 80% by weight, the remaining being the gel. Table IV sets forth the results.

Table IV

Characteristics of Glass Wool-Gel Paper Products

|  | Sample 15 | Sample 16 |
|---|---|---|
| Caliper (1/1000 inch) | 17 | 36 |
| Basis wt. (lbs/MSF) | 33.8 | 69.0 |

Table IV-continued

Characteristics of Glass Wool-Gel Paper Products

|  | Sample 15 | Sample 16 |
|---|---|---|
| Porosity (sec/100cc) | 3.5 | 5.0 |
| Tensile (lbs/in. width) | 25.0 | 40.6 |
| Break Length (meters) | 2760 | 2200 |
| Tear Factor (grams) | 94 | 116 |
| Ap. Specific Gravity | 0.382 | 0.370 |

As shown by Table IV when compared with the previous Tables, glass wool, particularly at this diameter fiber, tends to give greater strengths than mineral wool, even in a lighter weight sheet.

Fire Resistance

To determine whether the above-described product will give improved fire resistance such as is required in some gypsum wallboards covered with paper, samples were tested for flame travel in the following manner. Test samples cut ½ inch wide and 6 inches long were placed horizontally between two fire bricks leaving about 3 inches exposed. A match flame was held at the exposed end of the strip until it ignited. Flame travel was timed and measured. The control was conventional newslined paper coversheet used by United States Gypsum Company to cover wallboard, having a caliper of 0.015 inches and a basis weight of about 55 lbs/MSF. Of particular importance was whether the paper was selfextinguishing. Table V sets forth the results.

Table V

| Sample | Fire Resistance Time of Burning | Self-Extinguishing |
|---|---|---|
| Control | 35 sec. to burn 2 inches | No |
| Slag wool Sample No. 9 from Table II | 10 sec. to burn ¼ inch | Yes |
| Glass wool Sample No. 15 from Table IV | 15 sec. to burn ½ inch | Yes |

Although these tests indicate that both the slag wool and the glass wool are clearly superior to conventional paper, it also is apparent that slag wool paper is slightly superior to glass wool paper, as might be expected from the higher melting temperature of slag wool.

The above superior fire resistance property, when combined with other characteristics and properties, make the product of the invention particularly useful as cover sheets for gypsum wallboard, as when limited to a caliper of between about 0.032 inches and about 0.013 inches. More specifically, an important characteristic for wallboard is cover sheets having increased dimensional stability, as without it the board cover sheet may form cockles. Instability also prevents accurate prediction of shrinkage, resulting in greater dimensional deviations in the final board. The product of the invention has superior dimensional stability, as neither in the cellulosic fibers. The cellulosic fibers comprise between about 30% and 85% of the weight.

The following tests were made as described above, on 6-inch hand sheets. The mineral fibers were Birmingham white wool, except for the last one which was Corsicana white wool having a composition similar to that set forth above for sample 14, except with slightly less $Fe_2O_3$. The cellulosic fibers were repulped formboard paper comprising 40% ground wood and 60% kraft, prepared by a conventional process. However, the invention is not limited to this particular cellulosic fiber, as waste news, corrugated kraft, and flyleaf shavings are also suitable. The results are set forth in Table VI.

TABLE VI

CHARACTERISTICS OF CELLULOSIC FIBERS COMBINED WITH MINERAL FIBERS AND GEL

| Sample No. | Composition | Drainage Time, Sec. | Caliper 1/1000 Inch | Basis Wt. Lbs/MSF | Tensile Lbs/Inch Width | Break Length, Meters | Porosity (Sec/100cc) | Apparent Specific Gravity |
|---|---|---|---|---|---|---|---|---|
| 17 | 30% Mineral Fiber 10% Gel 60% Cellulosic | 21 | 12 | 34.2 | 20.0 | 2130 | 13 | 0.552 |
| 18 | 30% Mineral Fiber 20% Gel 50% Cellulosic | 67 | 11.5 | 34.4 | 24.5 | 2550 | 46 | 0.580 |
| 19 | 20% Mineral Fiber 10% Gel 70% Cellulosic | 25 | 11.5 | 31.8 | 22.7 | 2620 | 23 | 0.530 |
| 20 | 10% Mineral Fiber 20% Gel 70% Cellulosic | 43 | 11.5 | 36.7 | 11.9 | 1180 | 9 | 0.614 |
| 21 | 60% Mineral Fiber 10% Gel 30% Cellulosic | 14 | 11.5 | 35.7 | 11.0 | 1125 | 4 | 0.595 |
| 22 | 50% Mineral Fiber 10% Gel 40% Cellulosic | 16 | 12.5 | 36.4 | 13.4 | 1250 | 6 | 0.560 |
| 23 | 30% Mineral Fiber 5% Gel 65% Cellulosic | 5.5 | 6.5 | 15.5 | 5.78 | 1380 | 0.7 | 0.461 | the mineral fibers nor the gel are capable of absorbing moisture. That is, the drying of the gel is an irreversible process.

Gypsum board can thus be made with paper cover "sheets" comprising the invention, by the use of conventional apparatus and methods, as will be readily appreciated. Either front or back surfaces, or both, including the edge surfaces, of the rehydrated gypsum core are thus bonded to and covered by the paper product, the cover "sheets" having conventional positions on these surfaces. Although this product is not truly a paper sheet, such terminology is used in the wallboard trade.

In addition to gypsum wallboard cover sheets, other uses are available. For example, the product may be used as a decorative overlay for other slag wool products, including batts, felts, and tile, or for wood products wherein the dimensional stability again is important. It may also be used as wrappable insulation such as for pipes and the like. Because of the absence of cellulosic fibers, the product also has increased resistance to fungi and mildew.

Combined With Cellulosic Fibers

It has been found that, for some uses, cellulosic fibers may be combined with mineral fibers in making the furnish. Although the gel is still incorporated into the product as in the above-described embodiments, the minimum amount required can be reduced to 5% rather than 10% due to the hydrogen bonding available Such a product may be particularly used in those instances where strict fire resistance is not a requirement. For example, it may be used to reinforce saturating paper for plastic laminate construction.

Although the invention has been described in connection with certain preferred embodiments, it is not limited thereto. Rather, it includes all embodiments, equivalents, and alternate compositions as may be included within the scope of the following claims.

I claim:

1. A gypsum wallboard comprising a rehydrated gypsum core and a paper product covering being bonded to at least a surface of said core, said paper product comprising mineral fibers and a gel binder, the binder being characterized as a highly refined, nonfibrous cellulosic gel having a standard TAPPI drainage time of between about 300 to about 1200 seconds per 1.2 gram sheet weight, and a shrinkage value of at least 20% when roller after draining into a cylinder and dried unrestrained at about 250°F, the paper product having a thickness not exceeding about 0.080 inches, and an apparent specific gravity of between about 0.25 and about 0.85, said gel being present in an amount from about 10% to about 50% by weight of total gel fibers.

2. The product as defined in claim 1, wherein said fibers in the paper product are present in an amount of between about 50% and about 90% of the weight of the dry solids of the paper product, the remainder consisting essentially of said gel.

3. The product as defined in claim 2, wherein said fibers in the paper product are slag wool fibers.

4. The product as defined in claim 1, and further including cellulosic fibers present in an amount of between about 30% and about 85% of the weight of the total dry solids of the paper product.

5. The product as defined in claim 4, wherein said gel is present in the paper product in an amount comprising at least about 5% of the weight of the total dry solids of the paper product.

6. The product as defined in claim 1, wherein said gel is present in an amount comprising at least about 10% of the weight of the total dry solids of the paper product.

7. A product wherein the paper product as defined in claim 1, has a thickness which does not exceed about 0.012 inches.

* * * * *

UNITED STATES PATENT OFFICE
CERTIFICATE OF CORRECTION

Patent No. 3,952,130  Dated April 20, 1976

Inventor(s) Stephen G. Nason

It is certified that error appears in the above-identified patent and that said Letters Patent are hereby corrected as shown below:

TABLE II, COLUMN 8, SHOULD READ AS FOLLOWS:

Ap.Sp.Gr.

0.402
0.546
0.694
0.612
0.612

Signed and Sealed this

Twenty-seventh Day of July 1976

[SEAL]

Attest:

RUTH C. MASON
Attesting Officer

C. MARSHALL DANN
Commissioner of Patents and Trademarks